(12) United States Patent
Xuan et al.

(10) Patent No.: US 6,744,009 B1
(45) Date of Patent: Jun. 1, 2004

(54) COMBINED LASER-SCRIBING AND LASER-BREAKING FOR SHAPING OF BRITTLE SUBSTRATES

(75) Inventors: Jialuo Jack Xuan, Hayward, CA (US); Chung-Yuang Shih, Cupertino, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/227,751

(22) Filed: Aug. 27, 2002

Related U.S. Application Data

(60) Provisional application No. 60/369,693, filed on Apr. 2, 2002.

(51) Int. Cl.⁷ .................... B23K 26/14; B23K 26/16
(52) U.S. Cl. ....................... 219/121.67; 219/121.72
(58) Field of Search .................. 219/121.67, 121.68, 219/121.69, 121.72, 121.84, 121.82, 121.85

(56) References Cited

U.S. PATENT DOCUMENTS

| | | |
|---|---|---|
| 3,626,141 A | 12/1971 | Daly |
| 3,866,398 A | 2/1975 | Vernon, Jr. et al. |
| 4,865,686 A | 9/1989 | Sinohara |
| 5,609,284 A | 3/1997 | Kondratenko |
| 5,776,220 A | 7/1998 | Allaire et al. |
| 5,801,356 A | 9/1998 | Richman |
| 5,942,137 A | 8/1999 | Kamir et al. |
| 5,961,852 A | 10/1999 | Rafla-Yuan et al. |
| 6,211,488 B1 | 4/2001 | Hoekstra et al. |
| 6,252,197 B1 * | 6/2001 | Hoekstra et al. ........ 219/121.84 |
| 6,259,058 B1 | 7/2001 | Hoekstra |
| 2002/0006765 A1 * | 1/2002 | Michel et al. ................. 451/28 |

* cited by examiner

Primary Examiner—M. Alexandra Elve
(74) Attorney, Agent, or Firm—McDermott, Will & Emery

(57) ABSTRACT

A method of segmenting a sheet of a brittle material, comprising sequential steps of:
  subjecting the sheet to a first laser-based process to form a laser-scribing line extending from a surface of the sheet to a first depth below the surface;
  subjecting the sheet to a second laser-based process to form a laser-breaking line extending from the laser-scribing line at the first depth below the surface to a second, greater depth below the surface; and
  segmenting the sheet along the thus-formed combined laser scribing + laser-breaking line.

19 Claims, 5 Drawing Sheets

COMBINED LASER-SCRIBING AND LASER-BREAKING FOR SHAPING OF BRITTLE SUBSTRATES

CROSS-REFERENCE TO PROVISIONAL APPLICATION

This application claims priority from U.S. provisional patent application Serial No. 60/369,693 filed Apr. 2, 2002, the entire disclosure of which is incorporated herein by reference.

FIELD OF THE INVENTION

The present invention relates to a method for cutting sheets of brittle materials into desired configurations or shapes utilizing a combined laser-scribing and laser-breaking technique. The present invention has particular applicability in cutting or separating brittle, non-magnetic sheets along curvilinear paths to produce substrates for use in the manufacture of magnetic and/or magneto-optical (MO) recording media.

BACKGROUND OF THE INVENTION

Two techniques are conventionally employed for cutting or shaping a sheet of brittle material, such as a glass, amorphous glass, glass-ceramic or ceramic material, to form a sheet or substrate with a desired configuration or geometry. A first such conventional method involves mechanical scribing of the sheet employing a hard device, such as a diamond tip, to score the surface of the brittle material, which is then broken along the score line or pattern. The second of such conventional techniques involves laser-scribing. Currently employed laser-scribing differs from traditional high power (i.e., >1 KW) laser-drilling/cutting and utilizes a lower power (i.e., <500 W) for achieving scribing with less material removal and better edge quality subsequent to breaking/separation. Such laser-scribing typically utilizes a continuous wave ("CW") laser, such as a $CO_2$ laser of 10.6 $\mu$m wavelength, to heat a localized zone of a brittle material, such as an amorphous-glass sheet (similar to float glass), up to a temperature below the softening point of the material, and then immediately quenching the heated zone by applying a fluid coolant, e.g., a gas, such as air, a liquid, such as water, or a combination of a gas and a liquid, such as air/water.

In a typical process for laser-scribing an amorphous glass sheet, the output beam of a 10.6 $\mu$m CW $CO_2$ laser, or a high frequency pulse repetition rate 10.6 $\mu$m $CO_2$ laser, is re-shaped into a beam with an elongated spot shape, which beam is utilized in an unfocussed manner for locally heating the glass. The locally heated zone is then chilled by spraying thereon cool air or an air/liquid (e.g., air/water) mixture. When the localized heating/cooling process starts from a small surface defect or micro-crack made in the glass, e.g., by a means of a mechanical scriber or indenter, or by application of suitable laser pulses, the defect or micro-crack propagates to form a scribing line due to the combination of localized heating-quenching which initiates tiny surface cracks arising from compression-tension stress effects. The sheet of material is then separated, i.e., broken, along the scribing line by applying an external thermal or mechanical stress.

A conventional laser-scribing technique utilizing a low power $CO_2$ laser is disclosed by Kondratenko in U.S. Pat. No. 5,609,284, wherein an elliptical target area is impinged with a beam of coherent radiation along the intended direction of the crack, while a stream of fluid coolant is directed at a point on the heated surface on the intended line of the crack. U.S. Pat. No. 6,259,058 B1 to Hoekstra discloses a modification of U.S. Pat. No. 5,609,284 wherein dual laser beams are utilized after cooling in order to assist separation along the laser-scribing line. Allaire et al. in U.S. Pat. No. 5,776,220 disclose a laser-scribing technique for brittle materials wherein the laser spot has an extremely elongated elliptical shape such that its major axis is greater than 20 mm to enable rapid scribing.

Conventional substrates for use in manufacturing magnetic recording media include various brittle materials, such as glasses, ceramics and glass-ceramics. In order to form annular disk-shaped substrates suitable for use in magnetic and/or magneto-optical (MO) recording media, two circular scribings must be performed with high precision, one defining the outer diameter (e.g., ranging from about 65 to about 95 mm, such as 84 mm) and one defining the inner diameter (e.g., ranging from about 20 to about 25 mm). However, applicability of current linear laser-scribing techniques, such as utilized with flat panels, to circular scribing for producing annularly-shaped substrates suitable for manufacture of disk-shaped magnetic and/or magneto-optical recording media, is limited, for at least the following reason: laser-scribing is very sensitive to variations of the glass material, including optical reflectivity of the surface, glass composition, surface and thickness uniformity, etc., resulting in that the $CO_2$ laser-based scribing process requires very precise control of defect initialization, laser power distribution, and cooling stream. As a consequence, current laser-scribing technology of amorphous glass substrates is generally restricted to linear scribing.

Another drawback/disadvantage of conventional laser-scribing technology is associated with the methodology for separating/breaking the brittle substrate (e.g., of amorphous glass) subsequent to laser-scribing. Specifically, because of the nature of the localized heating/cooling of the laser-scribing process, and due to the formation of a compression layer on the surface of the amorphous glass sheet, the propagation of micro-cracks during the laser-scribing process occurs in the layer nearest the glass surface. As a consequence, the scribe line provided by a single laser beam at the surface of a glass surface is insufficiently deep, and application of additional mechanical force to the glass sheet is typically required during the laser-scribing process or subsequent thereto, disadvantageously resulting in edge defects, residual stresses, increased risk of cracking resulting in product loss (i.e., low yield), reduced product throughput, and poor cost-effectiveness arising from a requirement for complicated, thus expensive, processing.

More specifically, FIG. 1 shows an example of a linear laser-scribing process performed on a glass sheet for separating the latter into two segments, wherein a stationary, elongated, elliptically-shaped $CO_2$ laser beam and a $H_2O$/air cooling spray are successively supplied to a moving glass sheet along a substantially straight line of defect initialization markers (indicated by dark circles in the drawing) previously formed in the surface of the sheet, as by mechanical scribing/indentation or pulse laser irradiation, to form a laser scribe line (indicated by the dashed line in the drawing) within the glass sheet.

FIG. 2 illustrates an example of a similar, curvilinear laser-scribing process performed on a square or rectangular glass sheet for shaping the latter into an annular disk-shaped substrate, e.g., for use in the manufacture of disk-shaped, thin film magnetic and/or magneto-optical (MO) recording media. In this instance, the sheet is preliminarily provided with defect initialization markers (again indicated by dark circles in the drawing) arranged in a pair of concentric circles having diameters generally corresponding to the desired inner diameter (ID) and outer diameter (OD) of the medium, and proportionately-sized, arcuately extending, elliptically-shaped, stationary $CO_2$ laser-scribing beams, along with a stationary $H_2O$/air cooling spray, are utilized for scribing each of the inner and outer diameters along the corresponding circular lines of defect initialization markers while the sheet is rotated about a central axis to effect relative movement between the sheet and each of the laser-scribing beam +$H_2O$/air spray combinations.

However, as indicated supra, because the thus-described conventional laser-scribing process: (1) involves localized heating/cooling, and (2) formation of compression layer on an amorphous glass surface, micro-crack formation occurs essentially only within the compression layer adjacent the glass surface. As a consequence, the laser scribing line which is formed is insufficiently deep, as shown in FIG. 3, and a post-scribing thermal-breaking step (refer to FIG. 4) is typically required to effect separation along the scribing line, in which step a portion of the sheet on one side of the scribing line is heated, while another portion of the sheet on the opposite side of the scribing line is chilled, causing the scribing line to propagate across substantially the entire thickness of the sheet, thereby facilitating separation.

Because conventional $CO_2$ laser-based scribing techniques can scribe glass substrates to a depth of only about 0.1–0.2 mm, when such conventional $CO_2$ laser-based scribing is utilized for shaping glass sheets for magnetic and for MO recording media with a current minimum thickness of about 0.7 mm, a significant fraction of the thickness of the glass material, e.g., at least about 0.3–0.5 mm, would be required to be broken in the above-described post-scribing thermal-breaking step. In cases where the substrate is of greater thickness, or where curvilinear scribing + breaking is to be effected, a pair of laser beams, with at least one laser beam adapted for adjustable offset vis-a-vis the other laser beam, may be utilized for scribing the upper and lower surfaces, respectively, as illustrated in FIG. 5. As shown in more detail in FIG. 6, removal of the center portion of the sheet (e.g., by post-scribing thermal treatment) for forming the ID of the disk is facilitated by presence of the offset alignment of the laser-scribing lines on opposite sides of the sheet.

However, the post-scribing thermal-breaking step is slow, complicated, and of inconsistent quality, leading to product loss (i.e., reduced yield) and additional expense, ultimately resulting in poor cost-effectiveness. Moreover, the heating/chilling aspect of the process is difficult to perform with thicker glass sheets.

In view of the above-described disadvantages, drawbacks, and difficulties associated with utilization of conventional laser-scribing + post-scribing thermal-breaking technology for separating/shaping brittle substrates, there exists a clear need for improved method and apparatus for laser-scribing and shaping brittle substrates along a desired path or contour, such as a curvilinear path, particularly a substantially circular path. Further, there exists a particular need for improved methodology and apparatus for laser-scribing and shaping brittle materials, such as glasses, ceramics and glass-ceramics, along substantially circular paths to form annular disk-shaped substrates for use in manufacturing magnetic and MO recording media.

The present invention, therefore, addresses and solves the above-described drawbacks, disadvantages, difficulties, and shortcomings of the conventional methodologies and instrumentalities for performing laser-scribing as part of a process for shaping brittle substrates. According to the invention, a laser-based process and apparatus is provided which is especially well-adapted for performing combined scribing and post-scribing separation/shaping of brittle substrates, such as glass sheets, into a desired shape/contour, e.g., into annular-shaped disks with inner and outer diameters for use in the manufacture of magnetic and/or MO recording media, which methodology and apparatus provide a simple, readily controllable manufacturing process with increased product throughput and cost-effectiveness.

DISCLOSURE OF THE INVENTION

An advantage of the present invention is an improved method of shaping a sheet of brittle material by segmenting.

Another advantage of the present invention is an improved method of separating a sheet of a brittle material into portions by means of combined laser-scribing + laser-breaking.

Yet another advantage of the present invention is an improved method of shaping a sheet of brittle material along concentric inner and outer circular paths to form an annular disk.

A further advantage of the present invention is an improved apparatus for shaping a sheet of brittle material by segmenting.

A still further advantage of the present invention is an improved apparatus for separating a sheet of a brittle material into portions by means of combined laser-scribing + laser-shaping.

A yet further advantage of the present invention is an improved apparatus for shaping a sheet of brittle material along concentric inner and outer circular paths to form an annular disk.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of segmenting a sheet of a brittle material, comprising sequential steps of:

subjecting the sheet to a first laser-based process to form a laser-scribing line extending from a first surface of the sheet to a first depth below the first surface;

subjecting the sheet to a second laser-based process to form a laser-breaking line extending from the laser-scribing line at the first depth below the first surface to a second, greater depth below the first surface; and segmenting the sheet along the thus-formed combined laser scribing + laser-breaking line, wherein the first laser-based process to form the laser-scribing line comprises sequential steps of:

irradiating selected portions of the first surface of the sheet to form locally heated portions; and cooling the locally heated portions.

According to embodiments of the present invention, the method comprises steps of:

(a) providing a sheet of a brittle material having first and second opposing surfaces separated by a thickness;

(b) providing an apparatus comprising at least a first combined laser-scribing/laser-breaking assembly including, in spaced-apart relation and in the recited order:
  (i) a first source of laser radiation adapted for irradiating selected portions of the first surface of the sheet of brittle material with a first wavelength laser beam for forming the laser-scribing line therein to the first depth below the first surface;
  (ii) a source of fluid coolant adapted for cooling the selected portions of the first surface of the sheet of brittle material subsequent to the irradiation by the first source of laser radiation; and
  (iii) a second source of laser radiation adapted for irradiating the selected portions of the first surface of the sheet of brittle material with a second wavelength laser beam for forming therein the laser-breaking line extending from the laser-scribing line at the first depth below the first surface to the second, greater depth below the first surface; the apparatus further comprising:
  (iv) means for effecting relative movement between the first surface of the sheet and the at least one combined laser-scribing/laser-breaking assembly;
(c) subjecting the first surface of the sheet to processing by the at least one combined laser-scribing/laser-breaking assembly, while effecting relative movement therebetween, to thereby form at least one combined laser-scribing + laser-breaking line having a predetermined depth below the first surface and extending along a predetermined path; and
(d) segmenting the sheet along the at least one combined laser-scribing + laser-breaking line extending along the predetermined path.

In accordance with embodiments of the present invention, step (a) comprises providing a sheet of brittle material including a plurality of defect initialization markers formed in the first surface thereof, the plurality of defect initialization markers extending along at least one line corresponding to the predetermined path of the at least one combined laser-scribing + laser-breaking line formed in step (c), and according to embodiments of the present invention, the plurality of defect initialization markers are formed in the first surface of the sheet by mechanical scribing, mechanical indentation, or pulsed-laser treatment.

According to certain preferred embodiments of the present invention, step (a) comprises providing a sheet of a brittle material selected from the group consisting of glass, amorphous glass, ceramics, and glass-ceramics; step (b) comprises providing an apparatus wherein the first wavelength laser beam from the first source (i) is of a longer wavelength than the second wavelength laser beam from the second source (iii), e.g., step (b) comprises providing an apparatus wherein the first source (i) of laser radiation is a CW $CO_2$ laser providing a first laser beam having a cross-sectional shape in the form of a first elongated ellipse, and the second source (iii) of laser radiation is a pulsed UV laser providing a second laser beam having a cross-sectional shape in the form of a second elongated ellipse, the first ellipse having a greater length than the second ellipse.

In accordance with further preferred embodiments of the present invention, step (b)) comprises providing an apparatus wherein the source of fluid coolant (ii) is a source of $H_2O$/air, and further comprises providing an apparatus wherein the means (iv) for effecting relative movement between the first surface of the sheet and the at least one combined laser-scribing/laser-breaking assembly comprises means for moving the sheet while maintaining the at least one combined laser-scribing laser-breaking assembly stationary, thereby to form the at least one combined laser-scribing + laser-breaking line extending along a said predetermined path.

According to embodiments of the present invention, step (c) comprises moving the first surface of the sheet to form therein at least one combined laser-scribing + laser-breaking line extending along at least one predetermined linear, curvilinear, or linear-curvilinear path; and according to certain preferred embodiments of the present invention, step (c) comprises rotating the first surface of the sheet about a central axis to form therein at least one combined laser-scribing + laser-breaking line extending along at least one predetermined circular path.

In accordance with further embodiments of the present invention, step (b) comprises providing an apparatus comprising a pair of radially spaced-apart, combined laser-scribing/laser-breaking assemblies each arranged in an arc around a central axis; step (c) comprises moving the first surface of the sheet about the central axis while maintaining each of the pair of combined laser/scribing/laser-breaking assemblies stationary to form therein a concentric pair of combined laser-scribing + laser-breaking lines extending along a pair of predetermined circular paths; and step (d) comprises segmenting the sheet along each of the concentric pair of combined laser-scribing + laser-breaking lines to form an annular disk-shaped substrate.

According to still further embodiments of the present invention, step (b) comprises providing an apparatus comprising another first source of laser radiation (i) adapted for irradiating selected portions of the second surface of the sheet of brittle material with the first wavelength laser beam for forming a laser-scribing line therein in substantial vertical registry with the combined laser-scribing + laser-breaking line.

Another aspect of the present invention is an apparatus for performing combined laser-scribing and laser-breaking of a sheet of a brittle material, comprising:
  (a) at least one combined laser-scribing/laser-breaking assembly including, in spaced-apart relation and in the recited order:
    (i) a first source of laser radiation adapted for irradiating selected portions of a first surface of the sheet of brittle material with a first wavelength laser beam for forming a laser-scribing line therein extending from the first surface to a first depth below the first surface;
    (ii) a source of fluid coolant adapted for cooling the selected portions of the first surface of the sheet subsequent to the irradiation by the first source of laser radiation; and
    (iii) a second source of laser radiation adapted for irradiating the selected portions of the first surface of the sheet with a second wavelength laser beam for forming therein a laser-breaking line extending from the first depth below the first surface to a second, greater depth below the first surface to thereby form a combined laser-scribing + laser-breaking line; and
  (b) means for effecting relative movement between the first surface of the sheet and the at least one combined laser-scribing/laser-breaking assembly to form at least one combined laser-scribing + laser-breaking line extending along a predetermined path.

According to certain embodiments of the present invention, the at least one combined laser-scribing/laser-breaking assembly (a) comprises: a first source (i) of laser radiation in the form of a CW $CO_2$ laser providing a first laser beam having a cross-sectional shape of a first elongated ellipse; a source of $H_2O$/air as the source of fluid coolant (ii); and a second source (iii) of laser radiation in the form of a pulsed UV laser providing a second laser beam of shorter wavelength than the first laser beam and having a cross-sectional shape in the form of a second elongated ellipse, the first ellipse having a greater length than the second ellipse; the means (b) for effecting relative movement between the first surface of the sheet and the at least one combined laser-scribing/laser-breaking assembly comprises means for moving the sheet while maintaining the at least one combined laser-scribing/laser-breaking assembly stationary, thereby to form the at least one combined laser-scribing + laser-breaking line extending along a predetermined linear, curvilinear, or linear-curvilinear path.

In accordance with further embodiments of the present invention, the apparatus comprises a pair of radially spaced-apart, combined laser-scribing/laser-breaking assemblies (a) each arranged in an arc around a central axis; and means (b) for effecting relative movement between the first surface of the sheet and the pair of combined laser-scribing/laser-breaking assemblies comprises means for rotating the sheet around the central axis while maintaining the pair of combined laser-scribing/laser-breaking assemblies stationary, to form in the sheet a concentric pair of combined laser-scribing + laser-breaking lines extending along a pair of predetermined circular paths.

According to still other embodiments of the present invention, the apparatus further comprises at least one additional first source of laser radiation (i) adapted for irradiating selected portions of a second, oppositely facing surface of the sheet of brittle material with a first wavelength laser beam for forming at least one laser-scribing line therein in substantial vertical registry with a the at least one combined laser-scribing + laser-breaking line formed by the at least one combined laser-scribing/laser-breaking assembly.

Yet another aspect of the present invention is an apparatus for performing combined laser-scribing and laser-breaking of a sheet of a brittle material, comprising:

(a) means for performing combined laser-scribing + laser-breaking of a sheet of brittle material; and (b) means for moving the sheet of brittle material relative to means (a) to form therein at least one combined laser-scribing + laser-breaking line extending along a predetermined path.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from (he spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like identifying expressions are employed throughout to designate similar features, wherein.

DESCRIPTION OF THE INVENTION

The present invention is based upon the discovery by the inventors that reliable and well-controlled linear and/or curvilinear separation/segmentation of sheets of brittle, non-metallic materials, such as of glass, can be accomplished in cost-effective manner by means of simplified methodology and apparatus for performing combined laser-scribing and post-scribing laser-breaking of brittle sheets at higher product throughput rates and yields (i.e., reduced product loss rates) than attainable with conventional $CO_2$ laser-based scribing technology.

Briefly stated, according to the invention, a first laser source, e.g., a CW $CO_2$ laser Operating at a wavelength of 10.6 $\mu$m, and a fluid coolant source, is utilized for performing laser-scribing of a continuously moving sheet of brittle material to form a scribing line originating from a previously formed defect (initiator) in the surface of the sheet and extending downwardly to a first, relatively shallow depth below the surface, which laser-scribing process is immediately followed by a laser-breaking process utilizing a second, shorter wavelength laser source, e.g., a UV laser operating at a wavelength of 355 nm, for forming a microcrack-containing breaking zone extending downwardly into the sheet from the first, relatively shallow depth of the laser-scribed line to a second, relatively deep depth. Separation, i.e., segmentation, of the sheet along the resultant combined laser-scribing + laser-breaking line is then readily accomplished to yield high edge quality at high throughput rates at high product yield. The inventive methodology is equally applicable to separation/segmentation of brittle substrates along linear, curvilinear, or linear-curvilinear combined laser-scribing + laser-breaking lines.

The invention thus provides a $CO_2$ + UV laser-based solution to the problem of performing accurate and cost-effective separation of sheets of glass and other brittle, non-metallic materials along curvilinear paths, particularly as required in the manufacture of annular disk-shaped substrates for magnetic and/or magneto-optical (MO) recording media requiring formation of a circularly-shaped outer periphery (i.e., outer diameter, OD) and a circularly-shaped inner hole (i.e., inner diameter, ID).

Figure 1:
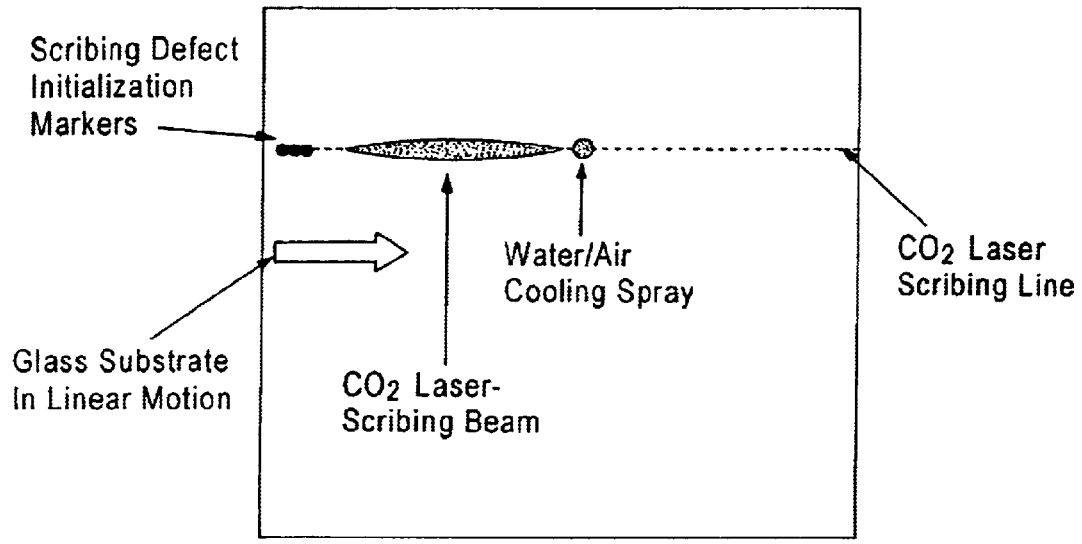
FIGS. 1–2 are simplified, schematic plan views for illustrating conventional linear and circular $CO_2$ laser-scribing, respectively, of glass sheets.
Figure 2:
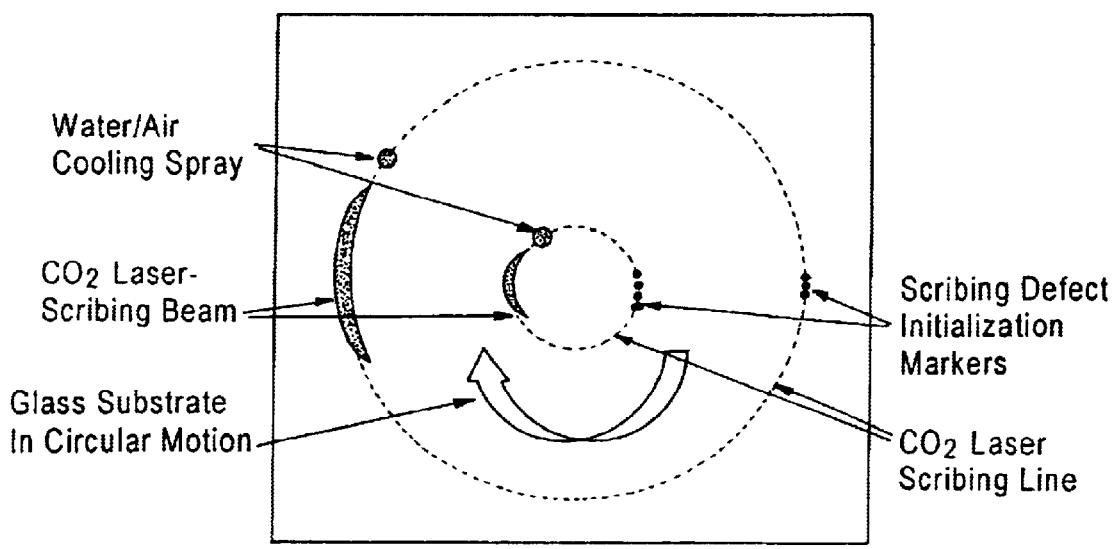
Figure 3:
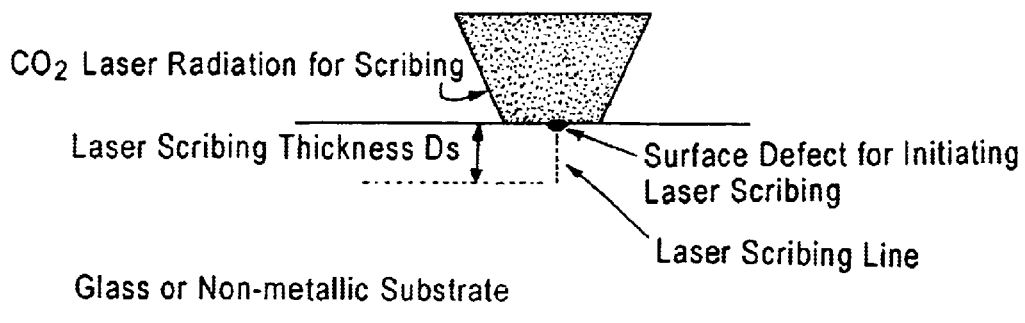
FIG. 3 is a simplified, schematic cross-sectional view for illustrating conventional, single-stage $CO_2$ laser-scribing of a single surface of a glass sheet.
Figure 4:
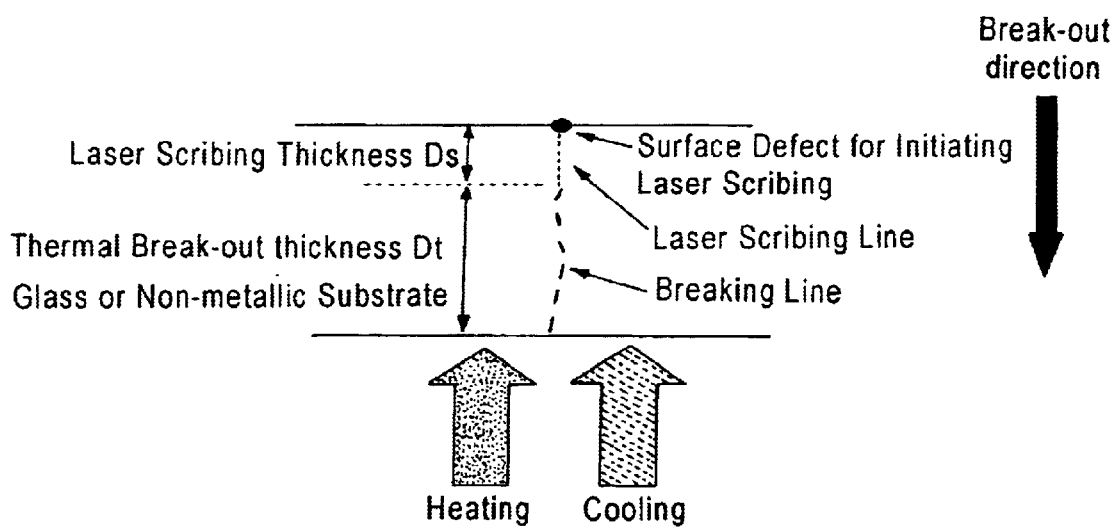
FIG. 4 is a simplified, schematic cross-sectional view for illustrating conventional, two-stage $CO_2$ laser-scribing of a single surface of a glass sheet.
Figure 5:
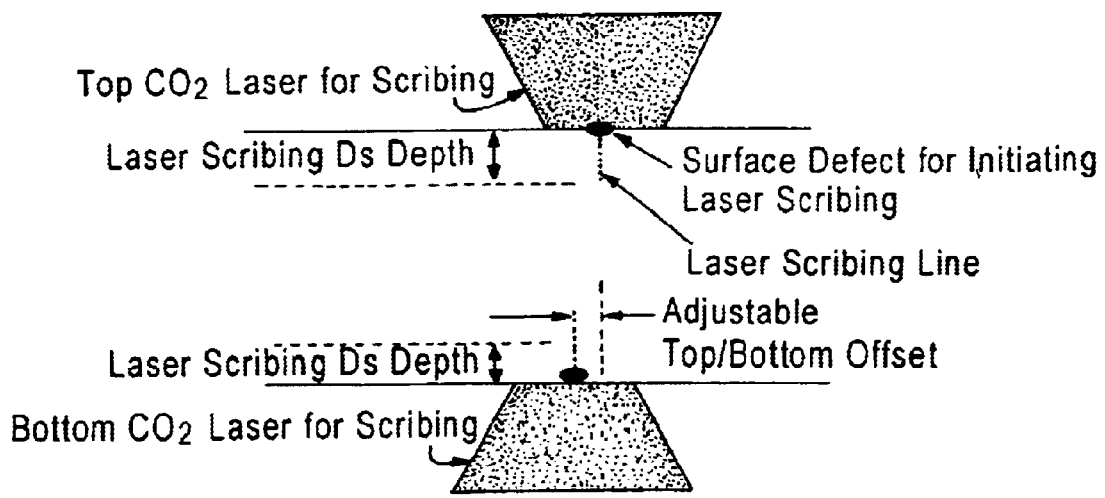
FIG. 5 is a simplified, schematic cross-sectional view for illustrating conventional, single-stage $CO_2$ laser-scribing of both surfaces of a glass sheet with adjustable offset of the top and bottom laser scribings.
Figure 6:
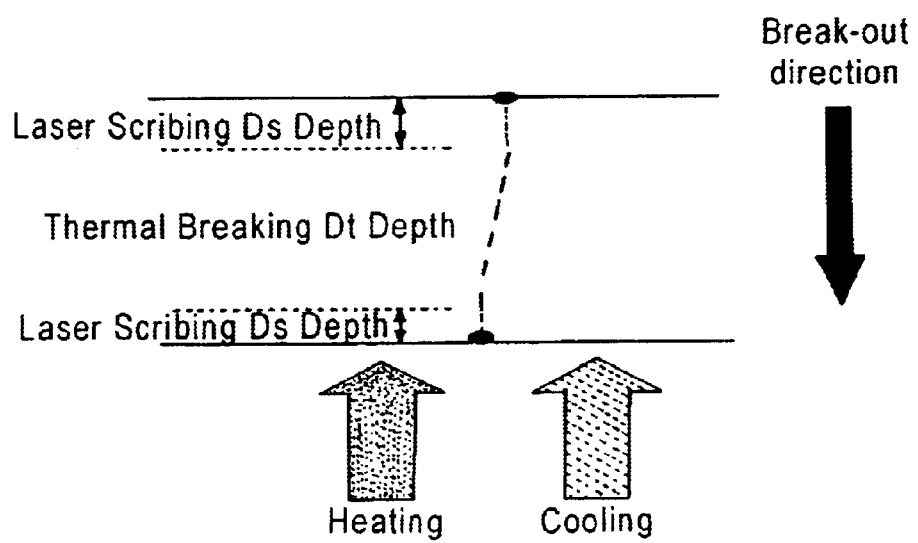
FIG. 6 is a simplified, schematic cross-sectional view for illustrating conventional, two-stage $CO_2$ laser-scribing of both surfaces of a glass sheet with adjustable offset of the top and bottom laser scribings.
Figure 7:
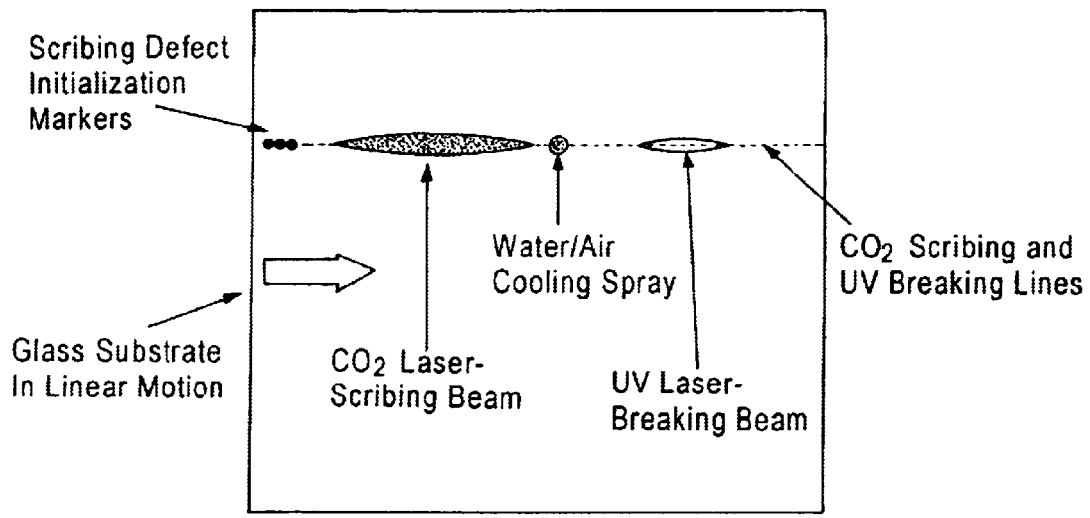
FIGS. 7–8 are simplified, schematic plan views for illustrating apparatus and method for performing linear and circular, single-stage combined laser-scribing + laser-breaking, respectively, of glass sheets according to embodiments of the present invention.

Referring to FIG. 7, illustrated therein is a simplified, schematic plan views for illustrating apparatus and method for performing linear, single-stage combined laser-scribing + laser-breaking, respectively, of glass sheets according to an embodiment of the present invention, wherein a surface (e.g., the upper surface) of a generally square or rectangularly-shaped sheet of a brittle material, illustratively of glass, is initially provided, as by a mechanical scribing or indentation process, or by a laser pulsing process, with a plurality of closely-spaced defect initialization markers (indicated in the figures by solid black circles) arranged in a predetermined path (e.g., linear, curvilinear, linear-curvilinear, etc.) corresponding to the predetermined path along which the sheet is to be cut or separated to form a desired shape. According to the linear, single-stage, combined laser-scribing + laser-breaking embodiment of FIG. 7, a linearly-configured, combined laser-scribing + laser-breaking assembly is provided above the upper surface of the sheet in vertical registry with the line of defect initialization markers, the assembly comprising, in linearly spaced-apart relation and in the following order:

(i) a first stationary source of laser radiation, illustratively a CW $CO_2$ laser, adapted for irradiating portions of the upper surface of the sheet with a first wavelength laser beam, e.g., an elongated, elliptically-shaped beam at a wavelength of 10.6 μm and power of about 20–60 W, while linearly moving the sheet relative to the first laser source with the beam therefrom vertically aligned or registered with the line of defect initialization markers, to form a laser-scribing line extending to a first depth below the upper surface of the sheet;

(ii) a stationary source of fluid coolant, e.g., a nozzle or equivalent means adapted for providing a flow of a suitable coolant, such as an air/$H_2O$ mixture, for rapidly cooling the laser-scribing line formed in the upper surface of the sheet of brittle material by irradiation from the first laser radiation source; and (iii) a second stationary source of laser radiation, illustratively a pulsed UV laser, adapted for irradiating the cooled laser-scribing line with a second, shorter wavelength (thus higher-energy) laser beam, e.g., an elongated, elliptically-shaped beam at a wavelength from about 196 to about 355 nm, a pulse repetition rate from about 10 to about 100 KH, and an average power of about 1–7 W, for forming a laser-breaking line extending from the laser-scribing line at the first depth to a second, greater depth.

According to the invention, the sheet is linearly transported at a suitable speed, e.g., from about 10 to about 100 mm/sec., relative to the linearly-arranged combined laser-scribing + laser-breaking assembly stationarily positioned above the upper surface of the sheet (typically by means positioned beneath the sheet and thus not visible in the drawing), with the assembly in vertical registry with the line formed by the defect initialization markers, to form in the sheet a combined laser scribing + laser-breaking line extending for the length of the line formed by the defect initialization markers. Upon completion of the above-described combined laser scribing and laser-breaking process, the sheet is readily and reliably separated (as by application of slight mechanical pressure into segments along the resultant combined laser-scribing + laser breaking line, which segments advantageously exhibit well-formed, defect-free, easily polished edge surfaces.

Figure 8:
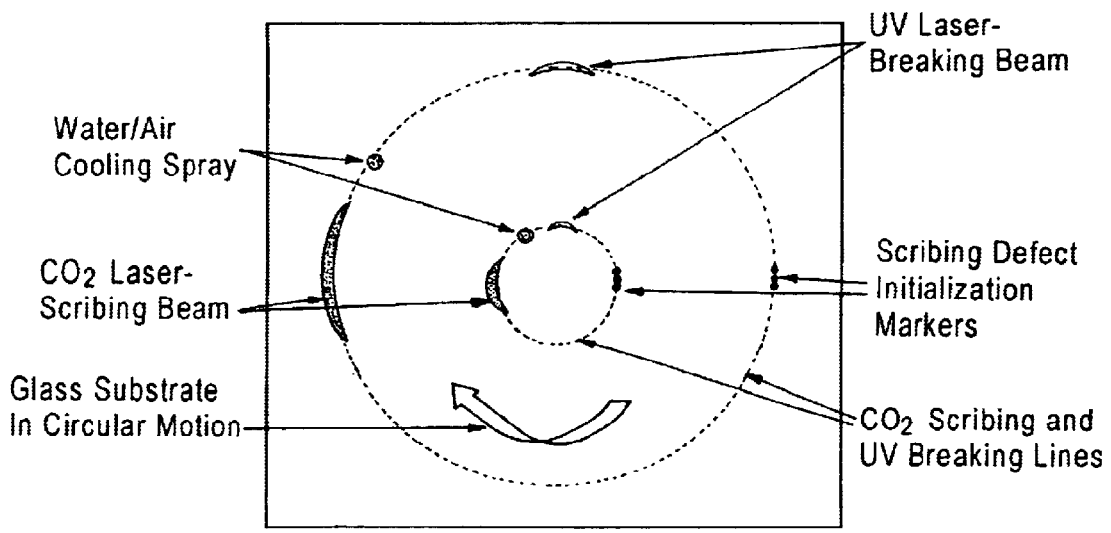

FIG. 8 is a simplified, schematic plan view for illustrating apparatus and method for performing curvilinear, i.e., circular, single-stage combined laser-scribing + laser-breaking, respectively, of glass sheets according to an embodiment of the present invention of particular utility in forming annular disk-shaped substrates suitable for use in the manufacture of magnetic and/or magneto-optical (MO) recording media. According to this embodiment, a generally square or rectangularly-shaped sheet of a brittle material, e.g., of glass, is preliminarily provided with a concentric pair of circularly-shaped lines of defect initialization markers and a pair of stationary, concentric, radially spaced-apart, arcuately-configured, combined laser-scribing + laser-breaking assemblies are provided above the upper surface of the sheet in vertical registry with the respective concentric lines of defect initialization markers, and the sheet is rotated about its central axis (typically by means positioned beneath the sheet and thus not visible in the drawing), which axis is common to the lines of defect initialization markers and the arcs of the combined laser-scribing + laser-breaking assemblies, for forming concentric inner and outer combined laser-scribing + laser-breaking lines. If the diameters of the inner and outer circles are appropriately selected, separation (segmentation) of the sheet along each of the combined laser scribing + laser-breaking lines results in the formation of annular disks with ID and OD suitable for recording media manufacture.

As is evident from FIG. 8, the elliptically-shaped laser beams from each of the first and second laser sources of the assembly utilized for forming the OD laser-scribing + laser-breaking line are of greater length than the beams from the corresponding first and second laser sources of the assembly utilized for forming the ID laser-scribing + laser-breaking line, and the distances (i.e., spacings) between adjacent members of the outer assembly are greater than the corresponding distances between adjacent members of the inner assembly.

Figure 9:
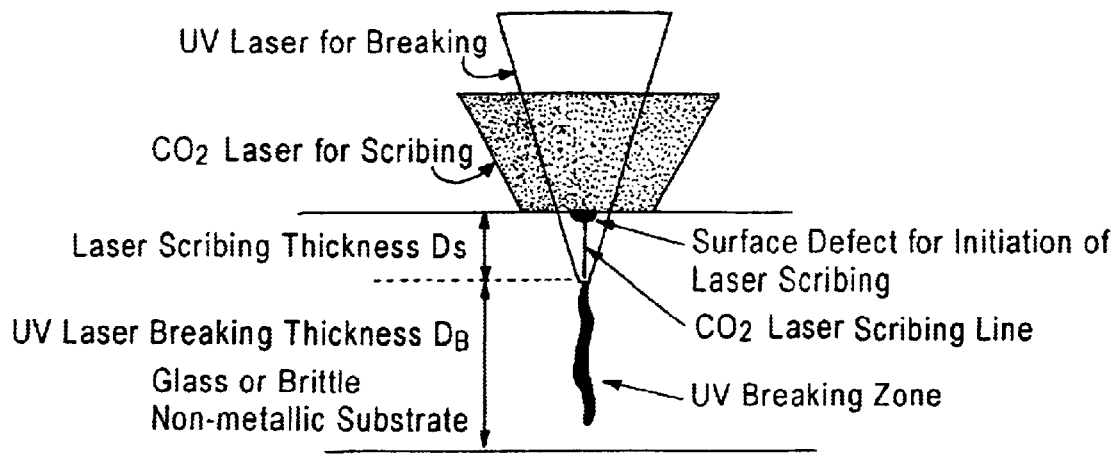
FIG. 9 is a simplified, schematic cross-sectional view for illustrating the principle of single-stage combined laser-scribing + laser-breaking of glass sheets according to embodiments of the present invention.

FIG. 9 is a simplified, schematic cross-sectional view illustrating the principle of single-stage combined laser-scribing + laser-breaking of glass sheets according to the above-described linear and curvilinear embodiments of the present invention. As shown in the figure, the beams from each of the first and second laser sources are vertically aligned with the defect(s) preliminarily formed in the upper surface of the sheet for initiating the laser-scribing process performed by the first laser, e.g., a CW $CO_2$ laser, which results, upon movement of the sheet, in formation of a laser-scribing line extending down from the upper surface for a depth $D_S$. Laser-breaking, performed by means of the second laser, e.g., a pulsed UV laser, subsequent to rapid cooling of the laser-scribing line, e.g., by fluid coolant flow from the coolant source, results in formation of a laser-breaking line vertically aligned with the laser-scribing line and extending from depth $D_S$ of the latter for a second, deeper depth $D_B$, such that the combined depth $D_S+D_B$ of the laser-scribing and laser-breaking lines is significant fraction of the thickness of the sheet, whereby reliable separation (segmentation) therealong is facilitated.

By way of illustration, but not limitation, a glass sheet of 0.7–1.0 mm thickness may be subjected to combined laser-scribing + laser-breaking, wherein a CW $CO_2$ laser operating at a wavelength of 10.6 μm and with an elliptically-shaped beam having a "footprint" about 1 mm wide and 30 mm long is utilized for forming a laser-scribing line (after air/$H_2O$ cooling) extending for a depth $D_S$ of 0.1–0.2 mm, and a pulsed UV laser operating at a wavelength of 355 nm and focussed to an elongated spot about 2–4 μm wide and 6–10 μm long at the laser-scribing depth $D_S$ is utilized for forming a laser-breaking line extending for a depth $D_B$ of 0.15–0.20 mm. Thus, the combined depth $D_S+D_B$ of the laser-scribing and laser-breaking lines may be as much as 50% of the thickness of the glass sheet. The peak UV laser pulse energy and pulse width are optimized to form 3-dimensional cracks within glass sheets and the material at the center of the sheet is locally broken. The thickness $D_B$ of the laser-breaking segment of the combined laser-scribing + laser-breaking line is determined by a combination of laser processing parameters, including UV beam shape, peak energy of the UV pulses, pulse width, pulse frequency, and the relative moving speed of the sheet vis-a-vis the laser beam.

Figure 10:
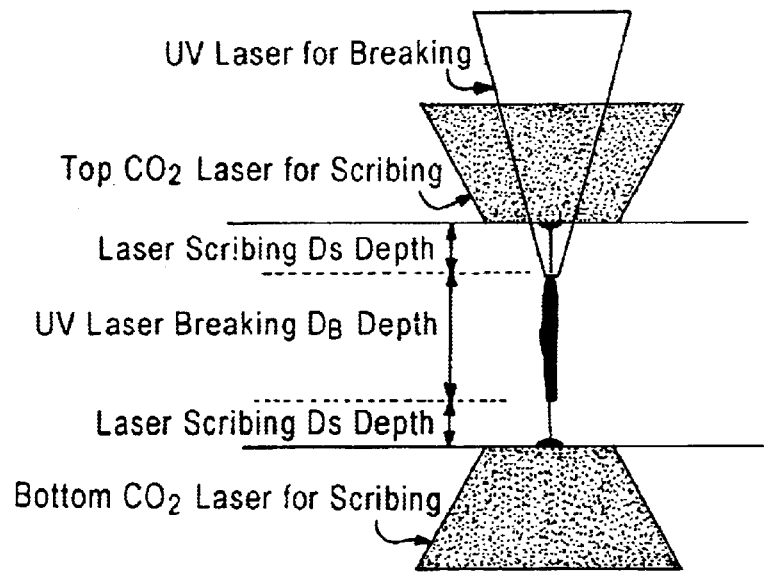
FIG. 10 is a simplified, schematic cross-sectional view for illustrating apparatus, method, and the principle of single-stage combined laser-scribing + laser-breaking of glass sheets with an additional laser-scribing stage, according to embodiments of the present invention.

Adverting to FIG. 10, shown therein is a simplified, schematic cross-sectional view for illustrating apparatus, method, and the principle of single-stage combined laser-scribing + laser-breaking of glass sheets with an additional laser-scribing stage, according to further embodiments of the present invention which are particularly useful in performing combined laser-scribing + laser-breaking of relatively thicker sheets of brittle materials. According to this embodiment, the lower surface of the sheet is preliminarily provided with a line of defect initiation markers in vertical alignment or registry with the line of defect initiation markers on the upper surface thereof, and the apparatus further includes an additional first laser source (e.g., a CW $CO_2$ laser operating at a wavelength of 10.6 μm) below the lower surface of the sheet for forming an additional (i.e., second) laser-scribing line of depth $D_S$. Thus, according to this embodiment, the combined laser-scribing + laser breaking line will have an ultimate thickness equal to $D_B+2D_S$. By way of illustration, when CW $CO_2$ and pulsed UV lasers as described above are utilized and $D_S$=0.12–0.15 mm and $D_B$=0.15–0.20 mm, 0.7–1.0 mm thick glass sheets may be cut in a single stage at a very high throughput, based on an average relative motion speed of the sheet of about 80 mm/sec.

As for edge quality subsequent to separation/segmentation along the combined laser-scribing + laser-breaking line(s), the $CO_2$ laser-scribed portion(s) of the edge surface(s) is (are) sharp and smooth, since no material is removed during micro-crack propagation. The center portion(s) of the edge surface(s) has (have) a width of 25–50 μm due to formation of continuous micro-cracks by the focussed, pulsed UV laser (5 μm spot size), and can be readily and cost-effectively polished into a smooth edge. Use of a shorter wavelength UV laser, e.g., at 266 nm, can further reduce the width of the breaking line, leading to smooth edge surfaces.

The inventive methodology and apparatus and methodology enjoys particular utility in the manufacture of annular disk-shaped, thin-film magnetic and/or MO recording media utilizing various brittle, non-metallic substrates such as of glass, amorphous glass, ceramics, glass-ceramics, etc., wherein the manufacturing process involves shaping a sheet of substrate material into annular disks via a separating technique involving scribing of the substrate. The inventive methodology and apparatus advantageously eliminates problems associated with conventional shaping/scribing methodologies, including formation of defects along the separated edges. Finally, the inventive methodology and apparatus is fully compatible with all other aspects of automated manufacture of magnetic and/or MO media and is broadly applicable to the manufacture of a variety of different products requiring shaping of brittle substrate materials.

In the previous description, numerous specific details are set forth, such as specific materials, structures, processes, etc., in order to provide a better understanding of the present invention. However, the present invention can be practiced without resorting to the details specifically set forth. In other instances, well-known processing materials, structures, and techniques have not been described in detail in order not to unnecessarily obscure the present invention.

Only the preferred embodiments of the present invention and but a few examples of its versatility are shown and described in the present invention. It is to be understood that the present invention is capable of use in various other embodiments and is susceptible of changes and/or modifications within the scope of the inventive concept as expressed herein.

What is claimed is:

1. A method of segmenting a sheet of a brittle material, comprising sequential steps of:
    subjecting said sheet to a first laser-based process to form therein a laser-scribing line extending from a first surface of said sheet to a first depth below said first surface;
    subjecting said sheet to a second laser-based process to form therein a laser-breaking line extending from said laser-scribing line at said first depth below said first surface to a second, greater depth below said first surface; and
    segmenting said sheet along the thus-formed combined laser scribing + laser-breaking line.

2. The method according to claim 1, wherein said first laser-based process to form said laser-scribing line comprises sequential steps of:
    irradiating selected portions of said first surface of said sheet to form locally heated portions; and
    cooling said locally heated portions.

3. The method according to claim 2, comprising steps of:
    (a) providing a said sheet of a brittle material having first and second opposing surfaces separated by a thickness;
    (b) providing an apparatus comprising at least one combined laser-scribing/laser-breaking assembly, said assembly including, in spaced-apart relation and in the recited order:
        (i) a first source of laser radiation adapted for irradiating selected portions of said first surface of said sheet of brittle material with a first wavelength laser beam for forming said laser-scribing line therein to said first depth below said first surface;
        (ii) a source of fluid coolant adapted for cooling said selected portions of said first surface of said sheet of brittle material subsequent to said irradiation by said first source of laser radiation; and
        (iii) a second source of laser radiation adapted for irradiating said selected portions of said first surface of said sheet of brittle material with a second wavelength laser beam for forming therein said laser-breaking line extending from said laser-scribing line at said first depth to said second, greater depth;
    said apparatus further comprising:
        (iv) means for effecting relative movement between said first surface of said sheet and said at least one combined laser-scribing/laser-breaking assembly;

(c) subjecting said first surface of said sheet to processing by said at least one combined laser-scribing/laser-breaking assembly, while effecting relative movement therebetween, to thereby form at least one combined laser-scribing + laser-breaking line having a predetermined depth below said first surface and extending along a predetermined path; and (d) segmenting said sheet along said at least one combined laser-scribing + laser-breaking line extending along said predetermined path.

4. The method according to claim 3, wherein:

step (a) comprises providing a sheet of brittle material including a plurality of defect initialization markers formed in said first surface of said sheet, said plurality of defect initialization markers extending along at least one line corresponding to said predetermined path of said at least one combined laser-scribing + laser-breaking line formed in step (c).

5. The method according to claim 4, wherein:

step (a) comprises providing a sheet of brittle material including a said plurality of defect initialization markers formed in said first surface thereof by mechanical scribing, mechanical indentation, or pulsed-laser treatment.

6. The method according to claim 3, wherein:

step (a) comprises providing a sheet of a brittle material selected from the group consisting of glass, amorphous glass, ceramics, and glass-ceramics.

7. The method according to claim 3, wherein:

step (b) comprises providing a said apparatus wherein said first wavelength laser beam from said first source (i) is of a longer wavelength than said second wavelength laser beam from said second source (iii).

8. The method according to claim 7, wherein:

step (b) comprises providing a said apparatus wherein said first source (i) of laser radiation is a CW $CO_2$ laser providing a first laser beam having a cross-sectional shape in the form of a first elongated ellipse, and said second source (iii) of laser radiation is a pulsed UV laser providing a second laser beam having a cross-sectional shape in the form of a second elongated ellipse, said first ellipse having a greater length than said second ellipse.

9. The method according to claim 3, wherein:

step (b) comprises providing a said apparatus wherein said source of fluid coolant (ii) is a source of $H_2O$/air.

10. The method according to claim 3, wherein:

step (b) comprises providing a said apparatus wherein said means (iv) for effecting relative movement between said first surface of said sheet and said at least one combined laser-scribing/laser-breaking assembly comprises means for moving said sheet while maintaining said at least one combined laser-scribing/laser-breaking assembly stationary, thereby to form said at least one combined laser-scribing + laser-breaking line extending along a said predetermined path.

11. The method according to claim 10, wherein:

step (c) comprises moving said first surface of said sheet to form therein at least one combined laser-scribing + laser-breaking line extending along at least one predetermined linear, curvilinear, or linear-curvilinear path.

12. The method according to claim 10, wherein:

step (c) comprises rotating said first surface of said sheet about a central axis to form therein at least one combined laser-scribing + laser-breaking line extending along at least one predetermined circular path.

13. The method according to claim 12, wherein:

step (b) comprises providing an apparatus comprising a pair of radially spaced-apart, combined laser-scribing/laser-breaking assemblies arranged in an arc around said central axis;

step (c) comprises moving said first major surface of said sheet about said central axis while maintaining each of said pair of combined laser/scribing/laser-breaking assemblies stationary to form therein a concentric pair of combined laser-scribing + laser-breaking lines extending along a pair of predetermined circular paths; and step (d) comprises segmenting said sheet along each of said concentric pair of combined laser-scribing + laser-breaking lines to form an annular disk-shaped substrate.

14. The method according to claim 3, wherein:

step (b) comprises providing an apparatus comprising another first source of laser radiation (i) adapted for irradiating selected portions of said second surface of said sheet of brittle material with said first wavelength laser beam for forming a laser-scribing line therein in substantial vertical registry with said combined laser-scribing + laser-breaking line.

15. An apparatus for performing combined laser-scribing and laser-breaking of a sheet of a brittle material, comprising:

(a) at least one combined laser-scribing/laser-breaking assembly including, in spaced-apart relation and in the recited order (i) a first source of laser radiation adapted for irradiating selected portions of a first surface of said sheet of brittle material with a first wavelength laser beam for forming a laser-scribing line therein extending from said first surface to a first depth below said first surface;

(ii) a source of fluid coolant adapted for cooling said selected portions of said first surface of said sheet subsequent to said irradiation by said first source of laser radiation; and (iii) a second source of laser radiation adapted for irradiating said selected portions of said first surface of said sheet with a second wavelength laser beam for forming therein a laser-breaking line extending from said first depth below said first surface to a second, greater depth below said first surface to thereby form a combined laser-scribing + laser-breaking line; and (b) means for effecting relative movement between said first surface of said sheet and said at least one combined laser-scribing/laser-breaking assembly to form at least one said combined laser-scribing + laser-breaking line extending along a predetermined path.

16. The apparatus as in claim 15, wherein:

said at least one combined laser-scribing/laser-breaking assembly (a) comprises:

a first source (i) of laser radiation in the form of a CW $CO_2$ laser providing a first laser beam having a cross-sectional shape of a first elongated ellipse;

a source of $H_2O$/air as said source of fluid coolant (ii); and second source (iii) of laser radiation in the form of a pulsed UV laser providing a second laser beam of shorter wavelength than said first laser beam and having a cross-sectional shape of a second elongated ellipse, said first ellipse having a greater length than said second ellipse.

17. The apparatus as in claim 15, wherein:

said means (b) for effecting relative movement between said first surface of said sheet and said at least one combined laser-scribing/laser-breaking assembly comprises means for moving said sheet while maintaining said at least one combined laser-scribing/laser-breaking assembly stationary, thereby to form said at least one combined laser-scribing + laser-breaking line extending along a predetermined linear, curvilinear, or linear-curvilinear path.

18. The apparatus as in claim 15, wherein:

said apparatus comprises a pair of radially spaced-apart, combined laser-scribing/laser-breaking assemblies (a) each arranged in an arc around a central axis; and said means (b) for effecting relative movement between said first surface of said sheet and said pair of combined laser-scribing/laser-breaking assemblies comprises means for rotating said sheet around said central axis while maintaining said pair of combined laser-scribing/laser-breaking assemblies stationary, to form in said sheet a concentric pair of combined laser-scribing + laser-breaking lines extending along a pair of predetermined circular paths.

19. The apparatus as in claim 15, further comprising:

at least one additional first source of laser radiation (i) adapted for irradiating selected portions of a second, oppositely facing surface of said sheet of brittle material with a said first wavelength laser beam for forming at least one laser-scribing line therein in substantial vertical registry with a said at least one combined laser-scribing + laser-breaking line formed by said at least one combined laser-scribing/laser-breaking assembly.

* * * * *